United States Patent
Chiu et al.

(10) Patent No.: US 11,258,583 B2
(45) Date of Patent: Feb. 22, 2022

(54) METHOD FOR DATA STORAGE, DEVICE, AND COMPUTER READABLE DATA STORAGE MEDIUM

(71) Applicant: HON HAI PRECISION INDUSTRY CO., LTD., New Taipei (TW)

(72) Inventors: Liang-Te Chiu, New Taipei (TW); Chi-Jsung Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 535 days.

(21) Appl. No.: 16/391,727

(22) Filed: Apr. 23, 2019

(65) Prior Publication Data
US 2020/0213084 A1    Jul. 2, 2020

(30) Foreign Application Priority Data
Dec. 28, 2018   (CN) .......................... 201811629888.X

(51) Int. Cl.
| | |
|---|---|
| *H04L 9/06* | (2006.01) |
| *G06F 16/23* | (2019.01) |
| *G06F 16/2455* | (2019.01) |
| *G06F 16/248* | (2019.01) |
| *H04L 9/32* | (2006.01) |
| *H04L 9/30* | (2006.01) |
| *G06F 21/60* | (2013.01) |
| *G06F 16/27* | (2019.01) |

(52) U.S. Cl.
CPC ........ *H04L 9/0637* (2013.01); *G06F 16/2379* (2019.01); *G06F 16/248* (2019.01); *G06F 16/2455* (2019.01); *G06F 16/27* (2019.01); *G06F 21/602* (2013.01); *H04L 9/30* (2013.01); *H04L 9/3247* (2013.01); *H04L 2209/38* (2013.01)

(58) Field of Classification Search
CPC ....... H04L 9/0637; H04L 9/30; H04L 9/3247; H04L 2209/38; G06F 16/27; G06F 16/2379; G06F 16/2455; G06F 16/248; G06F 21/602
See application file for complete search history.

(56) References Cited

U.S. PATENT DOCUMENTS

| | | |
|---|---|---|
| 2014/0258731 A1 | 9/2014 | Chia et al. |
| 2017/0046652 A1 | 2/2017 | Haldenby et al. |

FOREIGN PATENT DOCUMENTS

| | | | |
|---|---|---|---|
| CN | 101461247 A | 6/2009 | |
| CN | 109086325 A * | 12/2018 | ......... H04L 67/1095 |
| CN | 106372533 B * | 4/2020 | |
| CN | 109447578 B * | 4/2021 | |

* cited by examiner

*Primary Examiner* — Arvin Eskandarnia
(74) *Attorney, Agent, or Firm* — ScienBiziP, P.C.

(57) ABSTRACT

A method for storing data establishes a blockchain network, a plurality of data blocks being stored on nodes of the blockchain network. The plurality of data blocks is stored in batches to form a plurality of data segments according to a preset storage period. Each data segment written to the blockchain network is encrypted and newly added data blocks are synchronized with the data blocks which are not stored in the data segment. The newly added data blocks, together with the data blocks not yet stored as the data segment are stored after the commencement of the storage period. A data storage device is also provided.

18 Claims, 6 Drawing Sheets

METHOD FOR DATA STORAGE, DEVICE, AND COMPUTER READABLE DATA STORAGE MEDIUM

FIELD

The disclosure generally relates to data storage technology.

BACKGROUND

A blockchain, which is a general ledger database that exists on a peer-to-peer network in multiple copies, is a way of storing data. It has the characteristics of collective maintenance and decentralization, and data in the blockchain cannot be tampered with.

Taking Bitcoin technology as an example, full-featured nodes (i.e. each user terminal) maintain the same ledger, and transactions worldwide are recorded entirely on the same ledger, the Bitcoin ledger has reached more than 150 gigabytes so far. When user needs to establish a Bitcoin node, it is necessary to download the ledger of more than 150G to synchronize the ledger, which takes a lot of time. The ledger being large also means that searching for transaction records can be slow.

BRIEF DESCRIPTION OF THE DRAWINGS

Implementations of the present technology will now be described, by way of embodiments, with reference to the attached figures.

DETAILED DESCRIPTION

Figure 1:
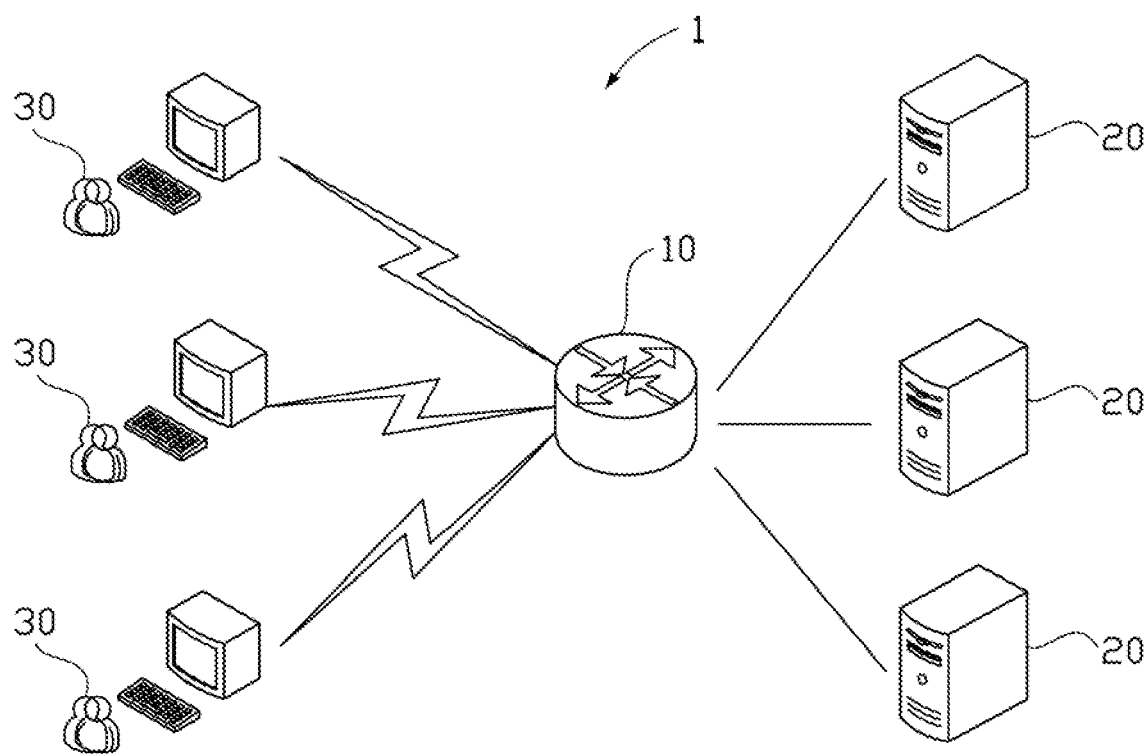
FIG. 1 is a schematic diagram of a data storage system in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrates a data storage system 1. The data storage system 1 includes a data storage device 10 and a plurality of servers 20 communicating with the data storage device 10.

Blockchain superimposes blocks of data in chronological order, and stores these as records in a plurality of nodes of a blockchain network, so that a reliable and unmodifiable database is maintained. In this embodiment, each of the plurality of the nodes in the blockchain is a data storage device 10. The data storage device 10 in the data storage system 1 can be written by a plurality of blockchain management units or leading units (hereinafter referred to as administrators 30). In at least one embodiment, a main function performed by the administrator 30 is to join new nodes and store data for the data blocks in batches.

Figure 2:
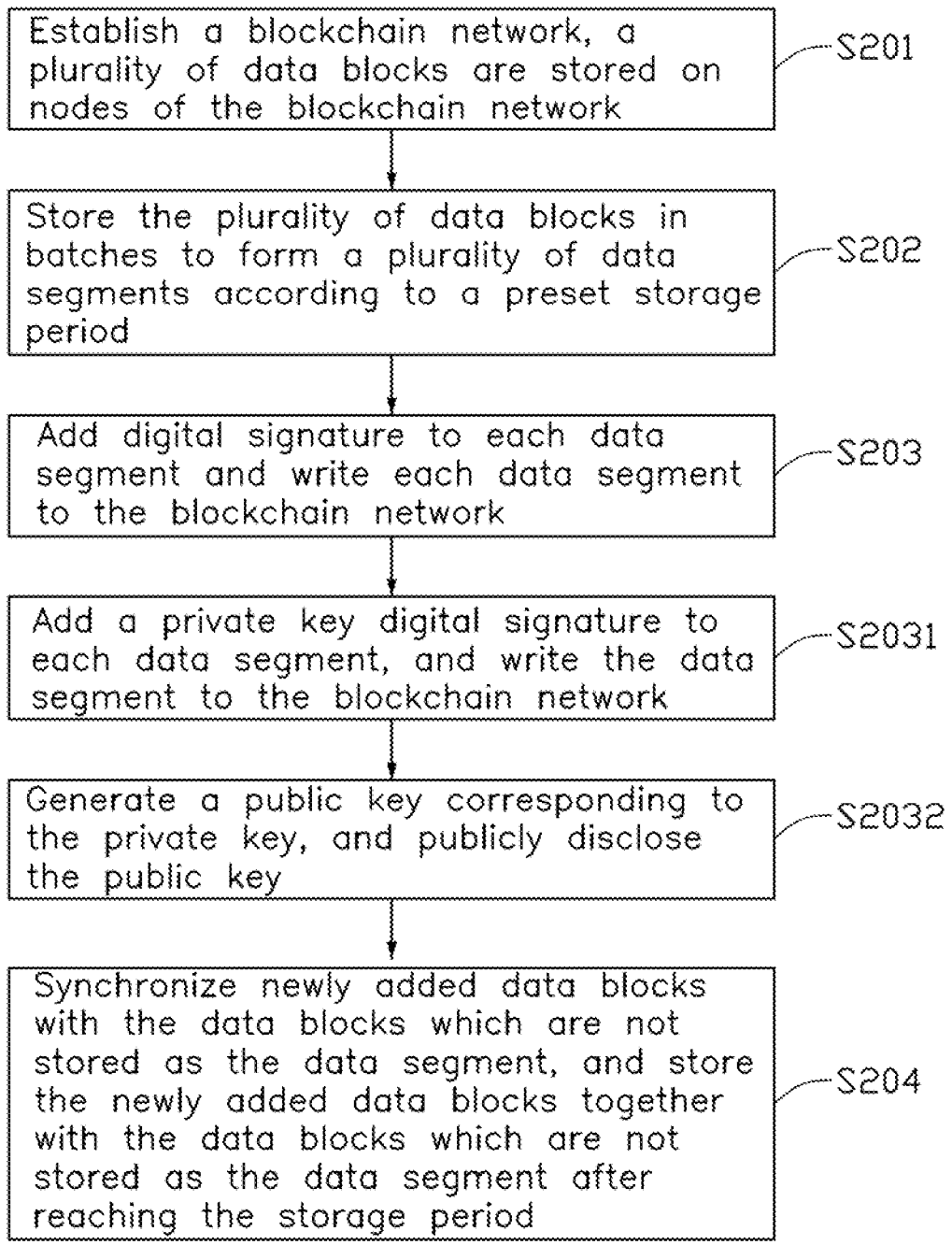
FIG. 2 is a flow chart of an embodiment of a data storage method.

FIG. 2 illustrates a data storage method according to an embodiment of this disclosure. The method is provided by way of embodiments, as there are a variety of ways to carry out the method. Each block shown in FIG. 2 represents one or more processes, methods, or subroutines carried out in the example method. Additionally, the illustrated order of blocks is by example only and the order of the blocks can be changed. Additional blocks can be added or fewer blocks may be utilized or the order of the blocks may be changed, without departing from this disclosure. The data storage method can begin at block S201.

At block S201, a blockchain network is established, and a plurality of data blocks are stored in nodes of the blockchain network.

A plurality of administrators 30 jointly establish a blockchain network and each node of the blockchain network can store a plurality of data blocks uploaded by the administrator 30. An uploader of the administrator 30 encrypts the data blocks. Before viewing the specific information in the data block, a verification code of the data block is needed. After the verification code is given, the specific information in the data block can be viewed.

At block S202, the plurality of data blocks are stored in batches according to a preset storage period to form a plurality of data segments.

Specifically, the storage period can be set by the administrator 30, and the plurality of data blocks can be periodically stored in batches to form the plurality of data segments. The storage period can be 30 days or other time period.

Furthermore, in order to facilitate subsequent viewing, the administrator 30 edits information for the data segment to be stored and stores the information in a fixed location of the blockchain network before storing the data in batches. The information (storage information) of each data segment includes, but is not limited to, a data segment size, a storage time, a starting block number, an ending block number, a data segment verification code (for example, md5 checksum), and a data segment storage location (for example, a URL).

At block S203, a digital signature is added to each data segment, and each data segment is written to the blockchain network.

In at least one embodiment, encryption process at block S203 includes the following steps.

At block S2031, a private key digital signature is added to each data segment, and the data segment is written to the blockchain network.

At block S2032, a public key is generated and publicly disclosed.

The generation of the private key and the public key may be implemented by using an asymmetric encryption algorithm, known in the prior art and not described. The public key can be posted on the official website.

The encryption process can also use other encryption methods.

The encrypted data segment is stored in a fixed position of the blockchain network. The position can be as follows.

Https://myip.com/data segment 1 (data block 1~103);
Https://myip.com/data segment 2 (data block 104~202);
Https://myip.com/data segment 3 (data block 203~304);
and so on, until
Https://myip.com/data segment N (data block xxxx~yyyy).

Some running data blocks have not been stored, and will be stored after the storage period expires.

At block S204, newly added data blocks are synchronized with the running data blocks which are not stored as the data segment and then all are stored after the storage period expires.

Figure 3:
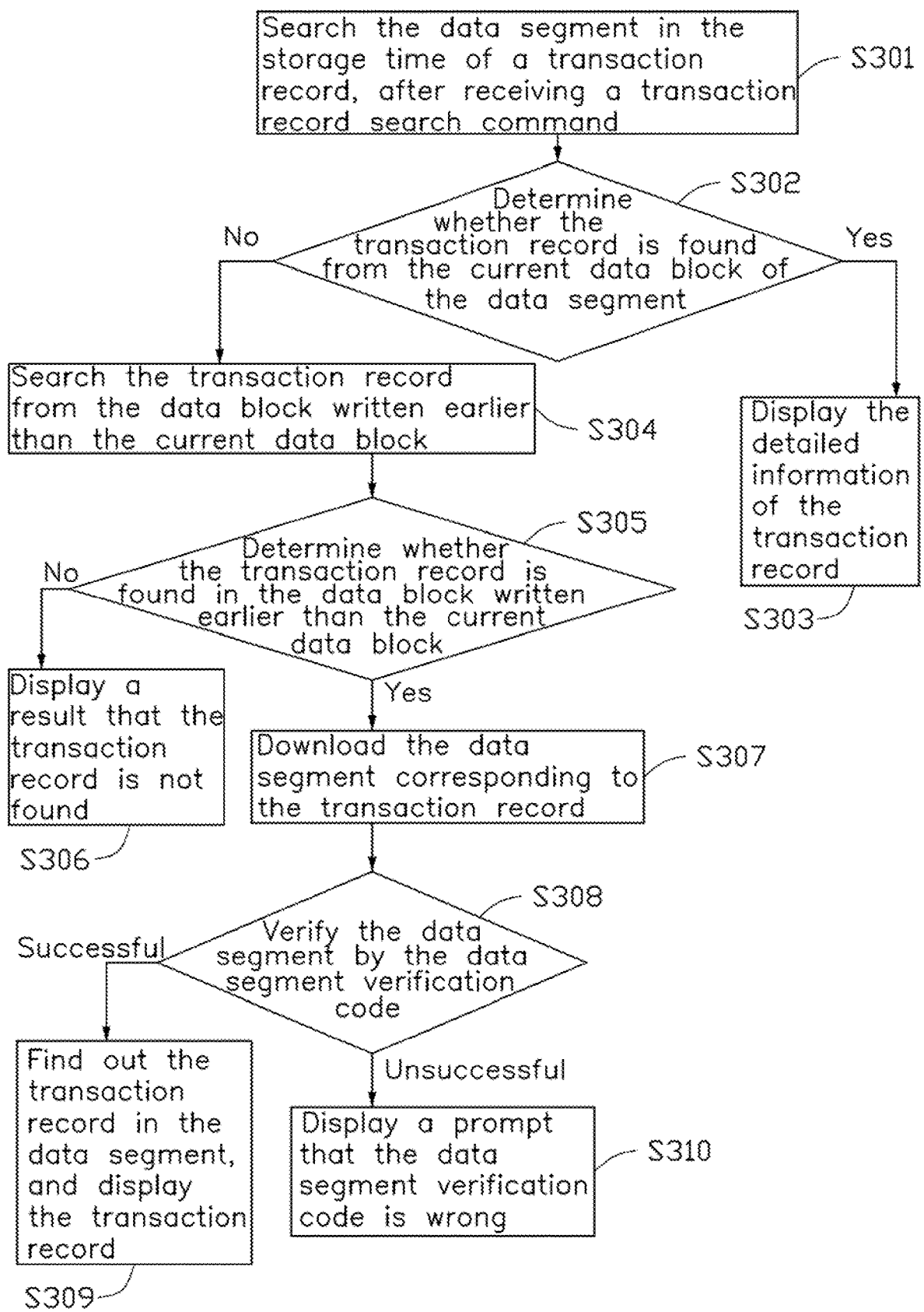
FIG. 3 is a flow chart of an embodiment of process of searching for a transaction record.

FIG. 3 illustrates a method of searching for a transaction record of an embodiment. The method is provided by way of embodiments, as there are a variety of ways to carry out the method. Each block shown in FIG. 3 represents one or more processes, methods, or subroutines carried out in the example method. Additionally, the illustrated order of blocks is by example only and the order of the blocks can be changed. Additional blocks can be added or fewer blocks may be utilized or the order of the blocks may be changed, without departing from this disclosure. The method can begin at block S301.

At block S301, after receiving a search command, the data segment in the storage time of the transaction record is searched.

A current data block containing a transaction record is searched for in the data segment. For example, the current data block 304 is searched for in the data segment 3.

At block S302, it is determined whether the transaction record can be found in the current data block of the data segment.

The index number of the transaction record is preset in advance by the administrator 30 to the search command in advance. For example, 1032 is shown as the index number, from the current data block 304.

If the transaction record is found in the current data block of the data segment, the process proceeds to block S303 to display detailed information of the transaction record. For example, if index number 1032 is found in the current data block 304, the detailed information of such transaction record is displayed.

If the transaction record is not found in the current data block of the data segment, the process proceeds to block S304 to find the transaction record from the data block written earlier than the current data block.

For example, an earlier written data block may be stored as the same data segment as the current data block, or may be stored as a different data segment from the current data block. Index number 1032 is to be found, and the currently searched data segment is the data segment 3 corresponding to data blocks 203~304. If index number 1032 is not found in the data block 304, a data block written earlier than data block 304, such as data block 204, can be searched.

At block S305, it is determined whether the transaction record is found in data block written earlier than the current data block.

If not, the process proceeds to block S306; If yes, the process proceeds to block S307.

At block S306, a result not found is displayed, where the transaction record is not found in the data block 204.

At block S307, the data segment corresponding to the transaction record is downloaded.

For example, if index number 1032 can be found in the data block 204, and the data block 204 records the related transaction information of the data segment 2, it is only necessary to download data segment 2 without downloading other data segments. When the administrators 30 add different nodes to the blockchain, that is, different data blocks, since the administrators 30 includes different administrators, such as buyers, sellers, and third parties, there is a time difference when adding different data blocks. Therefore, related transaction information in the data segment 2 may be stored in a certain data block in the data segment 3.

At block S308, the data segment corresponding to the transaction record is verified by a data segment verification code.

If a verification of the data segment verification code is successful, method proceeds to block S309.

At block S309, the required transaction record is found in the data segment, and the transaction record is displayed.

If the verification of the data segment verification code is unsuccessful, the method proceeds to block S310.

At block S310, a prompt that the data segment verification code is wrong is displayed.

For example, the information including the transaction record with index number 1032 is searched for in the data block 204 of the data segment 3, and the information of the data segment 3 is stored in the data segment 2. Then, the data segment 2 is verified using the data segment verification code. After the verification is successful, the information of the data block where the index number 1032 is stored can be viewed.

For example, the data segment 2 includes the data blocks 104-202, and the transaction record number with index 1032 is searched for in the data blocks 104-202. The transaction record number with index 1032 is stored in the data block 105, thus the transaction record can be displayed.

Figure 4:
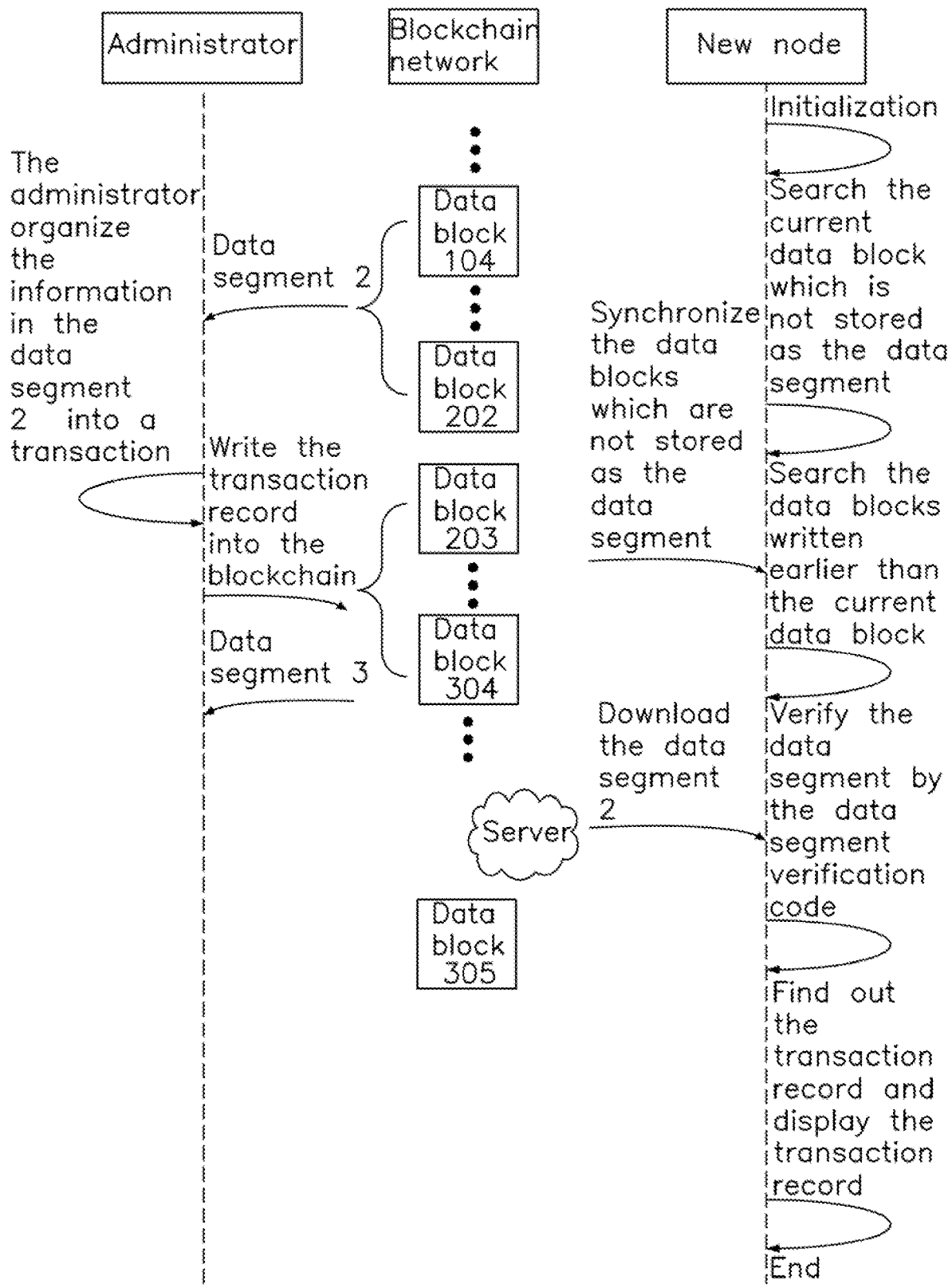
FIG. 4 is a sequence diagram in relation to a data storage method.
Figure 5:
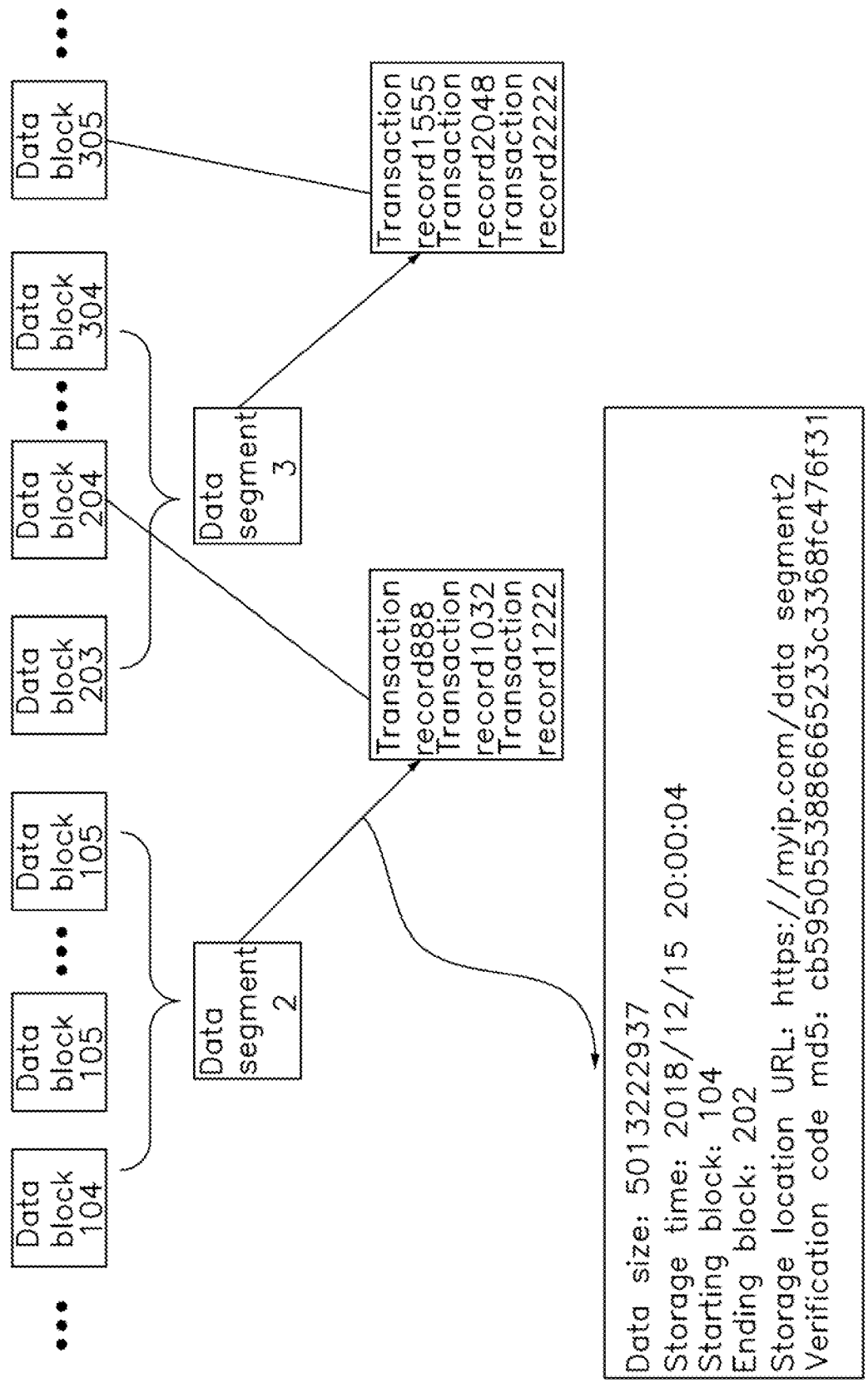
FIG. 5 is a schematic diagram of data blocks and data segments in the system of FIG. 1.

FIG. 4 illustrates sequence of a data storage method in an embodiment. FIG. 5 shows the data blocks and the data segments of an embodiment.

Specifically, the data blocks satisfying the storage period set by the administrator 30 are stored as the data segment 2. For example, the data segment 2 includes the data blocks 104-202, and the transaction information of the index number 1302 is included in the data block 204. The administrator 30 can organize the relevant information in the data segment 2 into a transaction and encrypt the transaction.

For example, the stored information of the data segment 2 is as follows. A data size of the storage information is 5013222937 bytes, the storage time is 2018/12/15 20:00:04, the starting block is the data block 104, the ending block is the data block 202, the storage location is URL: https://myip.com/data segment 2, and the data segment verification code is md5: cb5950553886665233c3368fc476f31. After the data blocks in the data segment 2 are stored, the continuously updated data blocks are written into the blockchain network by the administrators 30. The storage period for the newly written data blocks have not begun and the newly written data blocks are not stored as part of the data segment. The newly added data blocks are initialized and stored in synchronization with the unstored data blocks in the blockchain network.

A transaction record needs to be found after receiving a search command. For example, transaction record with index number 1032 is needed to be found. The current data block which is not stored as the data segment is searched. For example, the data block 304 is searched. If the transaction record is not found in the current data block, a data block stored earlier than the current data block is searched.

For example, the data block 204 or the data blocks 104-202 stored as the data segment 2 can be searched. If the number 1032 is found in the data block 204, the data block 204 also stores the transaction records indexed as 888 and 1222. The data block 204 includes the transaction information in the data segment 2, the number 1032 is stored in the data segment 2, and the data segment 2 can be downloaded. The data segment 2 is verified by the data segment verification code. If the verification of the data segment verification code is successful, the transaction record of the number 1032 is searched for in the data segment 2. For example, number 1032 is found in the data block 105 and a detailed transaction record can be displayed.

Similarly, related transaction information within the data segment 3 may be stored in the data block 305, such as transaction numbers indexed as 1555, 2048, and 2222.

After the newly added data blocks 203-304 reach the beginning of a storage period, the administrator 30 stores the data blocks as the data segment. The entire data storage process ends.

Figure 6:
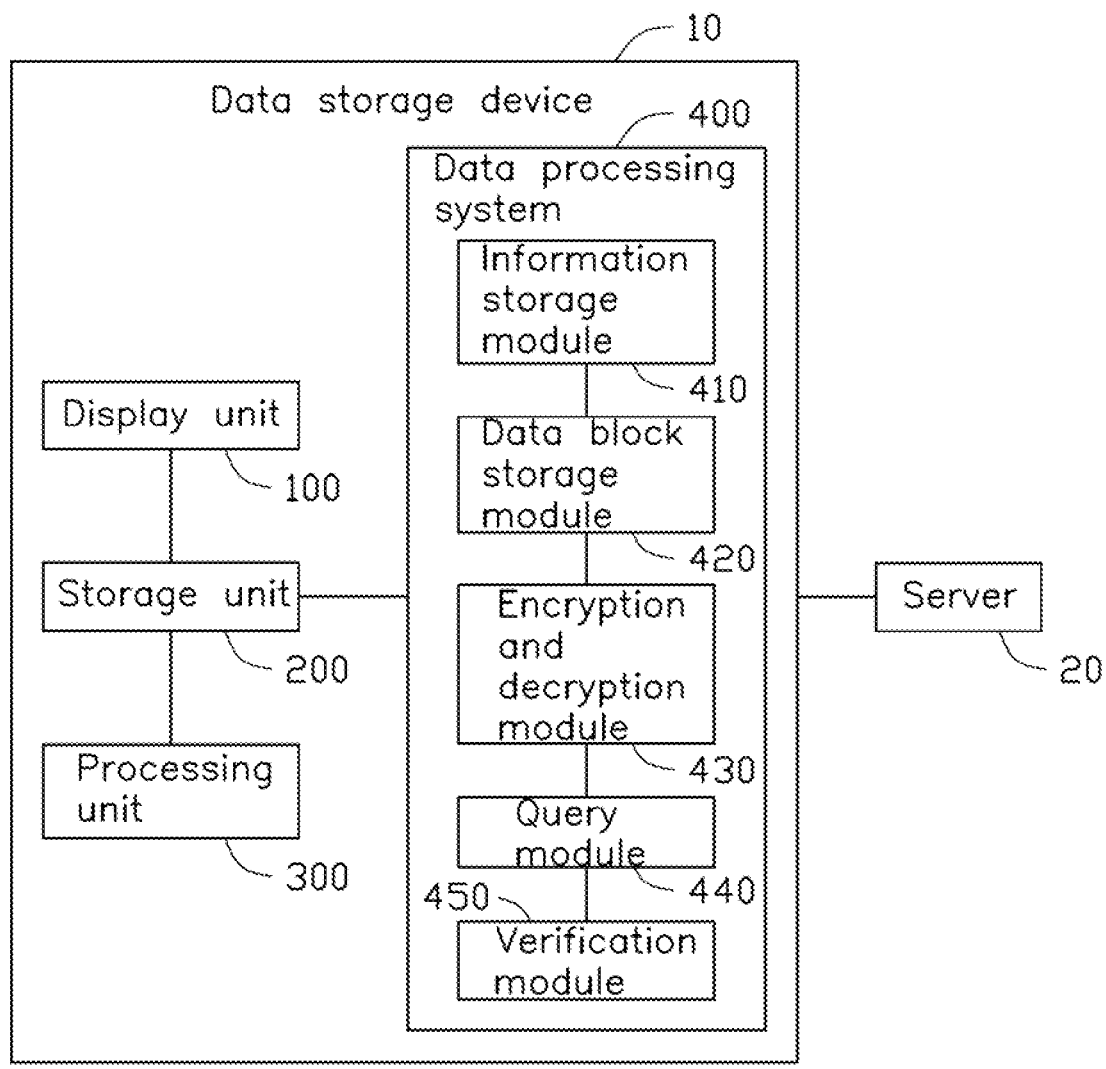
FIG. 6 is a schematic diagram of an embodiment of a data storage device.

FIG. 6 shows a data storage device 10 according to an embodiment of the present disclosure. The data storage device 10 establishes a communication with at least one server 20.

The data storage device 10 includes a display unit 100, a storage unit 200, and a processing unit 300. The display unit 100, the storage unit 200, and the processing unit 300 are electrically connected to each other.

The display unit 100 displays information as to the data blocks and the data segments.

The display unit 100 includes at least one display.

The displayed information of the data block may include, but is not limited to, an index number of the transaction record of the data block and the transaction record.

The displayed information of the data segment may include, but is not limited to, the size of the data segment, the storage time, the starting block number, the ending block number, the data segment verification code, and the storage location of the data segment.

The storage unit 200 can store data and code.

The storage unit 200 can be, but is not limited to, read-only memory (ROM), random-access memory (RAM), programmable read-only memory (PROM), erasable programmable ROM (EPROM), one-time programmable read-only memory (OTPROM), electrically EPROM (EEPROM), compact disc read-only memory (CD-ROM), hard disk, solid state drive, or other forms of electronic, electromagnetic, or optical recording medium.

The processor 300 can be a central processing unit (CPU), a digital signal processor, a single chip microcomputer, or other equivalent dedicated chip, adapted to implement each instruction.

The data storage device 10 can further include a data processing system 400. The data processing system 400 may include several modules, which are a collection of software instructions stored in the storage unit 200 and are executed by the processor 300. In the embodiment as disclosed, the data processing system 400 may include an information storage module 410, a data block storage module 420, an encryption and decryption module 430, a query module 440, and a verification module 450.

The information storage module 410 is configured to store information as to the data blocks and the data segments.

The information of the data blocks may include, but is not limited to, the transaction record number of the data block and the transaction record.

The information of the data segment may include, but is not limited to, the size of the storage data segment, the storage time, the starting block number and the ending block number, the data segment verification code, and the storage location of the data segment.

The data block storage module 420 is configured to store the plurality of data blocks to form a data segment in batches.

Specifically, the plurality of data blocks is stored to form a plurality of data segments according to a preset storage period. The preset storage period can be 30 days or other period. The data blocks are stored as data segment, when the data blocks satisfy the storage period The encryption and decryption module 430 is configured to encrypt and decrypt each data segment. The encryption process includes adding a private key digital signature on each data segment, writing the data segment into the blockchain network, generating a public key corresponding to the private key, and exposing the public key to the public.

Specifically, the private key and the public key may be generated by using an asymmetric encryption algorithm in the prior art.

The decryption process includes verifying the data segments associated with the transaction record using the data segment verification code.

The query module 440 is configured to look up transaction records within the data block. A query program is pre-stored in the query module 440, and the search is performed according to the pre-stored search program.

The verification module 450 is configured to determine whether the verification of the data segment using the data segment verification code is successful.

The disclosure further provides a computer readable storage medium, where instructions are stored, and the instructions can execute, on the computing device, the data storage method in the embodiments.

In addition, each functional device in each embodiment may be integrated in one processor, or each device may exist physically separately, or two or more devices may be integrated in one device. The above integrated device can be implemented in the form of hardware or in the form of hardware plus software function modules.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A data storage method, comprising:
   establishing a blockchain network, a plurality of data blocks being stored on nodes of the blockchain network;
   storing the plurality of data blocks in batches to form a plurality of data segments according to a preset storage period;
   encrypting each data segment and writing each data segment to the blockchain network; and
   synchronizing newly added data blocks with the data blocks which are not stored as the data segment, and storing the newly added data blocks together with the data blocks which are not stored as the data segment after reaching a beginning of the storage period.

2. The data storage method of claim 1, wherein the process of encrypting each data segment comprises:

adding a private key digital signature to each data segment; and generating a public key and publicly disclosing the public key.

3. The data storage method of claim 1, wherein after forming the data segment, the method further comprises:
editing an information of the data segment and storing the information in the blockchain network;
wherein the information of the data segment comprises a data segment size, a storage time, a starting block number, an ending block number, a data segment verification code, and a data segment storage location.

4. The data storage method of claim 3, wherein information of the data block comprises an index number of a transaction record and a transaction record.

5. The data storage method of claim 4, wherein the method further comprises a process of searching for a transaction record, the process comprises:
searching a data segment in the storage time of a transaction record, after receiving a search command;
determining whether the transaction record is found in a current data block of the data segment;
displaying the detailed information of the transaction record, if the transaction record is found in the data block of the data segment.

6. The data storage method of claim 5, wherein the process of searching for a transaction record further comprises:
searching the transaction record from the data block written earlier than the current data block, if the transaction record is not found in the data block of the data segment;
determining whether the transaction record is found in the data block written earlier than the current data block;
display a result that the transaction record is not found, if the transaction record is not found in the data block written earlier than the current data block;
downloading the data segment corresponding to the transaction record, if the transaction record is found in the data block written earlier than the current data block;
verifying the data segment by the data segment verification code;
finding out the transaction record in the data segment, and displaying the transaction record, if a verification is successful; and
displaying that the data segment verification code is wrong if the verification is unsuccessful.

7. A data storage device, configured to establish a communication connection with at least one server, the data storage device comprising:
a processor;
a storage unit storing one or more programs, when executed by the processor, the one or more programs causing the processor to:
establish a blockchain network, a plurality of data blocks being stored on nodes of the blockchain network;
store the plurality of data blocks in batch to form a plurality of data segments according to a preset storage period;
encrypt each data segment and writing each data segment to the blockchain network; and
synchronize newly added data blocks with the data blocks which are not stored as the data segment, and store the newly added data blocks together with the data blocks which are not stored as the data segment after reaching a beginning of a storage period.

8. The data storage device of claim 7, wherein the process of encrypting each data segment comprises:
adding a private key digital signature to each data segment; and
generating a public key and publicly disclosing the public key.

9. The data storage device of claim 8, wherein a storage information of the data segment comprises a data segment size, a storage time, a starting block number, an ending block number, a data segment verification code and a data segment storage location.

10. The data storage device of claim 9, wherein information of the data block comprises an index number of a transaction record number and a transaction record.

11. The data storage device of claim 10, wherein the one or more programs further cause the processor to:
search a data segment in the storage time of a transaction record, after receiving a search command;
determine whether the transaction record is found in a current data block of the data segment;
display the detailed information of the transaction record, if the transaction record is found in the data block of the data segment.

12. The data storage device of claim 11, wherein the one or more programs further cause the processor to:
search the transaction record from the data block written earlier than the current data block, if the transaction record is not found in the data block of the data segment;
determine whether the transaction record is found in the data block written earlier than the current data block;
display a result that the transaction record is not found, if the transaction record is not found in the data block written earlier than the current data block;
download the data segment corresponding to the transaction record, if the transaction record is found in the data block written earlier than the current data block;
verify the data segment by the data segment verification code;
finding out the transaction record in the data segment, and displaying the transaction record, if a verification is successful: and
displaying that the data segment verification code is wrong if the verification is unsuccessful.

13. A computer readable storage medium having stored thereon instructions that, when executed by at least one processor of a computing device, causes the processor to perform a data storage method, wherein the method comprises:
establishing a blockchain network, a plurality of data blocks being stored on nodes of the blockchain network;
storing the plurality of data blocks in batch to form a plurality of data segments according to a preset storage period;
encrypting each data segment and writing each data segment to the blockchain network; and
synchronizing newly added data blocks with the data blocks which are not stored as the data segment, and storing the newly added data blocks together with the data blocks which are not stored as the data segment after reaching a beginning of a storage period.

14. The computer readable storage medium of claim 13, the process of encrypting each data segment comprises:
adding a private key digital signature to each data segment; and generating a public key corresponding to the private key and publicly disclosing the public key.

15. The computer readable storage medium of claim 13, wherein after forming the data segment, the method further comprises:
editing a storage information for the data segment and storing the storage information in the blockchain network;
wherein the storage information of the data segment comprises a data segment size, a storage time, a starting block number, an ending block number, a data segment verification code and a data segment storage location.

16. The computer readable storage medium of claim 15, wherein information of the data block comprises a transaction record number and a transaction record.

17. The computer readable storage medium of claim 16, wherein the method further comprises a process of searching for a transaction record, the process comprises:
searching a data segment in the storage time of a transaction record, after receiving a transaction record search command;
determining whether the transaction record is found in a current data block of the data segment;
displaying the detailed information of the transaction record, if the transaction record is found in the data block of the data segment.

18. The computer readable storage medium of claim 17, wherein the process of searching for a transaction record further comprises:
searching the transaction record from the data block written earlier than the current data block, if the transaction record is not found in the data block of the data segment;
determining whether the transaction record is found in the data block written earlier than the current data block;
display a result that the transaction record is not found, if the transaction record is not found in the data block written earlier than the current data block;
downloading the data segment corresponding to the transaction record, if the transaction record is found in the data block written earlier than the current data block;
verifying the data segment by the data segment verification code;
finding out the transaction record in the data segment, and displaying the transaction record, if a verification is successful; and
displaying that the data segment verification code is wrong if the verification is unsuccessful.

* * * * *